Figure 1:
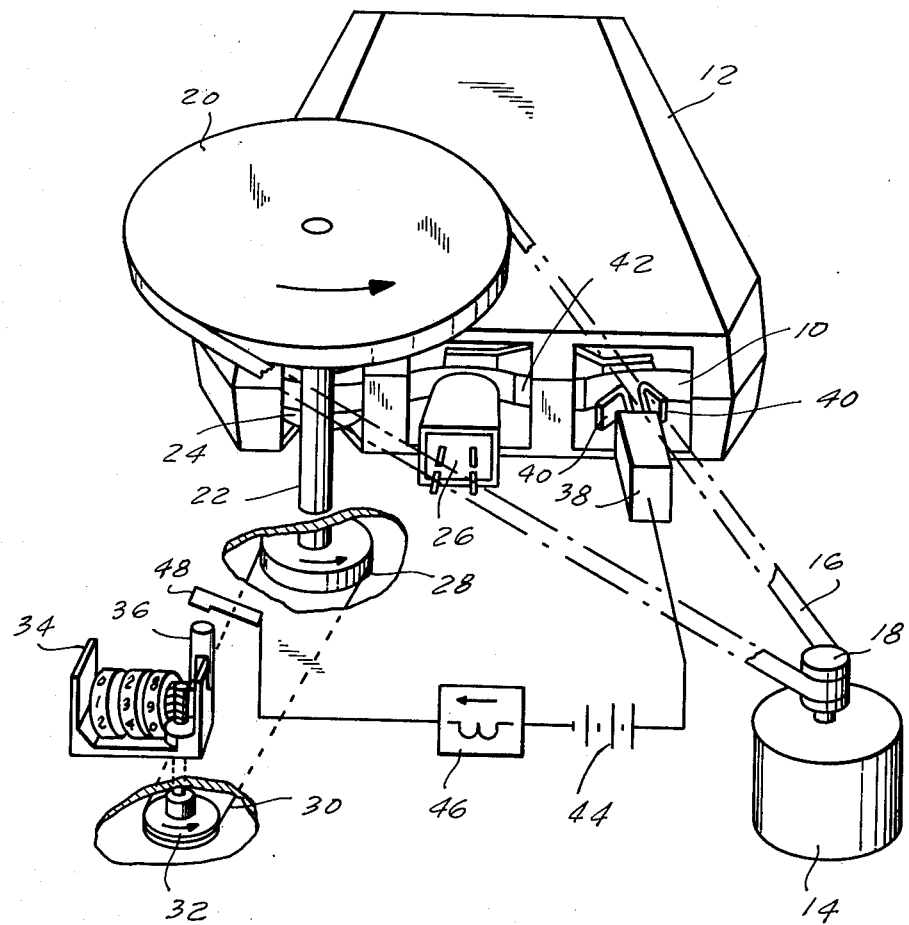

United States Patent [19]
Ono

[11] 3,946,437
[45] Mar. 23, 1976

[54] TAPE RECORDER WITH COUNTER DRIVE MECHANISM RESPONSIVE TO TAPE MOVEMENT

[75] Inventor: Ichiro Ono, Tokyo, Japan

[73] Assignee: Alps Electric Co., Ltd., Tokyo, Japan

[22] Filed: Sept. 30, 1974

[21] Appl. No.: 510,641

[30] Foreign Application Priority Data
Dec. 4, 1973  Japan.............................. 48-136618

[52] U.S. Cl. ..................... 360/79; 360/72; 360/137
[51] Int. Cl.² G11B 27/14; G11B 15/28; G11B 19/06
[58] Field of Search ........... 360/79, 71, 72, 137, 85; 242/201; 352/170–172; 179/100.1 DR

[56] References Cited
UNITED STATES PATENTS

| | | | |
|---|---|---|---|
| 3,449,733 | 6/1969 | Berquist | 360/137 |
| 3,467,791 | 9/1969 | Bolick, Jr. | 179/100.1 DR |
| 3,541,271 | 11/1970 | Joslow et al. | 360/72 |
| 3,575,575 | 4/1971 | Kean | 360/71 |
| 3,632,899 | 1/1972 | Ban | 360/71 |
| 3,688,058 | 8/1972 | Findley | 360/74 |
| 3,757,057 | 9/1973 | Fleming | 179/100.1 DR |

*Primary Examiner*—Alfred H. Eddleman

[57] ABSTRACT

A counter drive mechanism for use in a tape recorder having a resettable counter includes movable means preferably in the form of a rotatable disc having a tape engaging peripheral surface which abuts the tape such that the disc is rotated as the tape moves. The rotation of the disc is mechanically transferred to the counter to index same. Since the counter is driven in accordance with the movement of the tape, and not by the tape drive mechanism as is conventional, the accuracy of the counter is significantly enhanced. The peripheral surface of the disc is provided with a pair of electrically isolated conductive strips which, when electrically connected by contacting an electrically conductive foil strip on the tape, complete a circuit to energize the counter resetting means such that the counter is automatically reset at the appropriate tape position.

3 Claims, 2 Drawing Figures

TAPE RECORDER WITH COUNTER DRIVE MECHANISM RESPONSIVE TO TAPE MOVEMENT

The present invention relates to tape recorders having indexable counters for indicating the position of the tape and more particularly to a drive mechanism for such counters which enhances the accuracy of the counters.

Many conventional cartridge or cassette-type tape recorders do not include provision for rewinding the tape. Therefore, in order to record on or play back from a particular portion of the tape, especially when recorded material is present on other portions of the tape, it is necessary to wind the tape in the forward direction until the desired portion is reached. If, for instance due to the lack of accuracy of the counter, the beginning of the desired portion is passed, it is necessary to go through the entire track and then repeat the scan of the track again until the beginning of the desired portion of the tape is accurately located. Thus, the ease of pinpointing a particular portion of the tape is directly related to the accuracy of the counter which indicates the position of the tape. Unfortunately, prior art tape recorders of this type normally utilize counter drive mechanisms which are responsive to the tape drive mechanism instead of the movement of the tape itself. Since the operator, prior to recording, may manually stop the tape while the tape drive mechanism continues to run, the accuracy of the counter is significantly reduced because, although the tape has not moved, the tape drive mechanism is running thereby causing the counter to be indexed.

It is, therefore, a prime object of the present invention to provide a tape recorder having a counter drive mechanism which is directly responsive to the movement of the tape and independent of the tape drive means.

In accordance with the present invention, a tape recorder of the type having a tape drive mechanism and a counter for indicating the position of the tape is provided. The counter is indexed by a counter drive mechanism including movable means the movement of which is independent of the tape drive mechanism. The movable means abuts the tape and is driven by the movement of the tape. The counter is mechanically connected to the movable means such that it is driven by the movement of the movable means. In this manner, the counter is responsive only to the movement of the tape and is independent of the tape drive mechanism, thereby significantly enhancing the accuracy of the counter.

The recorder is provided with a mechanism which is actuatable to reset the counter at the beginning of each track. In order to actuate the counter resetting mechanism at the appropriate time, a portion of the tape is made electrically conductive, such as by affixing a metal foil thereto at the beginning of each track. The movable means is provided with a pair of electrically isolated conductive strips on the tape engaging portion thereof. When the electrically conductive portion of the tape contacts the electrically isolated conductive strips, the strips are electrically connected to complete the circuit which actuates the counter resetting mechanism.

Figure 2:
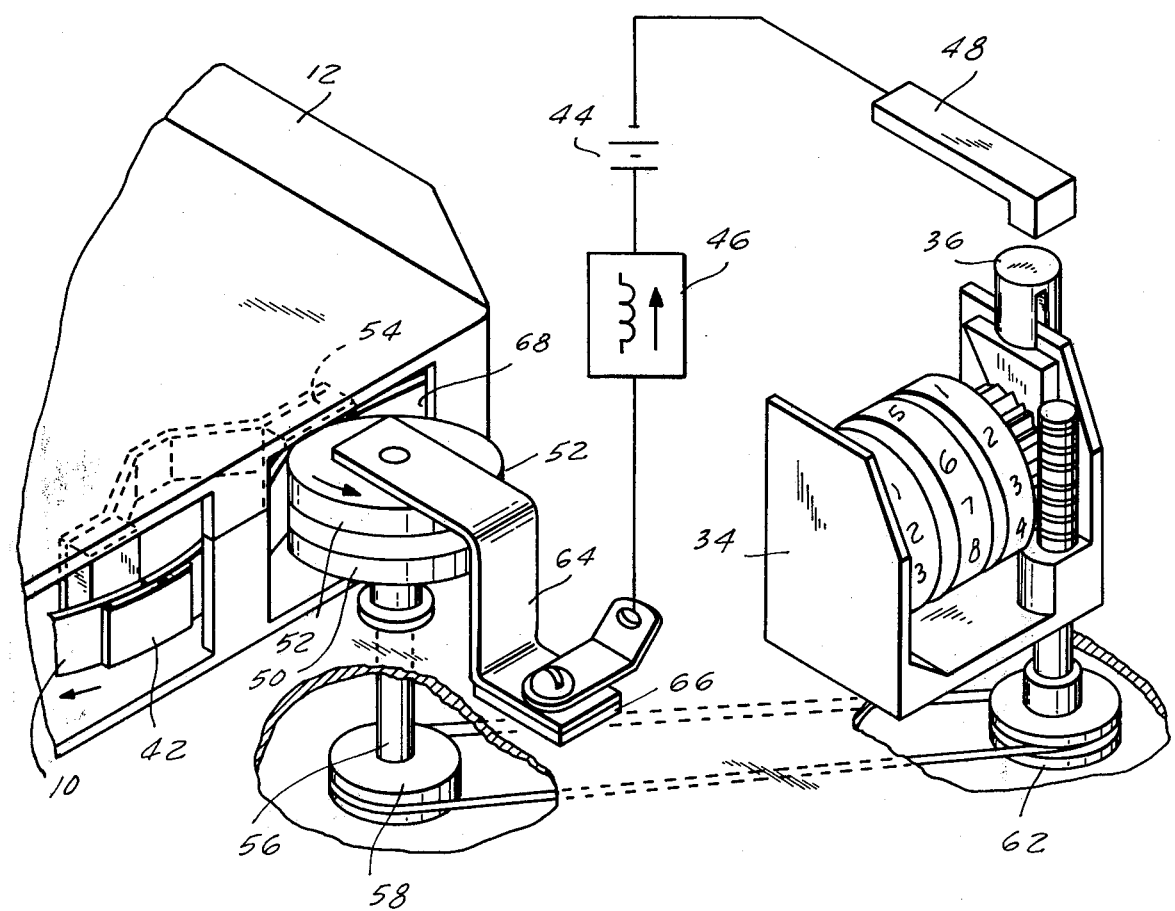

To these and other objects as may hereinafter appear, the present invention relates to a tape recorder having a counter drive mechanism directly responsive to the movement of the tape as defined by the appended claims and described in the specification taken together with the drawings wherein like numerals refer to like parts and in which:

FIG. 1 is an isometric view of a portion of a tape recorder equipped with conventional counter drive mechanism; and FIG. 2 is an isometric view of a portion of a tape recorder having a preferred embodiment of the counter drive mechanism of the present invention.

FIG. 1 shows a portion of a conventional tape recorder for playback or recording on a tape 10 contained within a cartridge 12. The tape drive system of the recorder includes a motor 14 which is connected to a belt 16 by means of a rotatable shaft 18. Belt 16 rotates a flywheel 20 which in turn is connected to a capstan shaft 22. Tape 10 is engaged between a pressure roller 24 and capstan shaft 22 such that the rotation of capstan shaft 22 causes movement of the tape along a magnetic head 26 wherein the recording or playback function is performed.

A wheel 28 is connected to the other end of capstan shaft 22 such that it is rotatable therewith. A belt 30 operably connects wheel 28 to a wheel 32 which is the input wheel for counter 34, shown here as a conventional mechanically driven position-indicating counter. Thus, the counter is indexed by the rotation of wheel 32.

Counter 34 is provided with a reset mechanism in the form of a button 36, the depression of which serves to reset counter 34 to zero. Preferably, this is accomplished each time a new track is begun on the tape and may be actuated by a portion of the mechanism which varies the position of the magnetic head each time the track is changed. In order to perform this function, a contact switch 38 is placed adjacent to tape 10 such that a pair of electrically isolated contacts 40 abut the tape as the tape is moved. At the beginning of the new track a piece of conductive foil 42 is affixed to the tape such that it passes adjacent contacts 40 to complete the electrical connection therebetween. Switch 38 is connected in series with a power source 44 and a solenoid 46, the plunger of which causes the necessary variation in the position of the magnetic head. This plunger is also mechanically connected to a lever 48 which is in alignment with the reset button 36 on counter 34 such that when foil 42 completes the electrical connection between contacts 40, solenoid 46 is connected to power source 44 thereby causing the plunger to move lever 48 thus depressing pushbutton 36 and thus reset counter 34. In this manner, track change and counter resetting may be accomplished simultaneously.

When a recording operation is to be carried out, often the operator will start recording by selecting an appropriate place on the tape and moving the tape until the selected portion thereof is opposite magnetic head 26. Although motor 14 is energized and capstan shaft 22 is rotating, the tape will be manually held stationary relative to head 26 until recording is commenced. Upon the commencement of the recording, the tape will be released thereby permitting the rotating capstan shaft 22 to move the tape relative to head 26. Thus, capstan shaft 22 may be rotating even though the movement of the magnetic tape is temporarily stopped. In this situation, a counter with a conventional drive mechanism will be indexed because of the rotation of the capstan shaft even though the tape is not moving thereby significantly reducing the accuracy of the counter. When several separate recordings are to be made within each track of a finite magnetic tape, inaccuracies in the counting operation may cause difficulties in allocating portions of the tape to the particular pieces recorded. Thus, it is considered a disadvantage to have the counter responsive to the rotation of the capstan shaft instead of responsive to the movement of the tape itself.

FIG. 2 shows a preferred embodiment of the present invention wherein the counter is directly responsive to the movement of the tape and not to the rotation of the capstan shaft, as previously described. This drawing shows a tape 10 situated within a cartridge 12. The tape drive mechanism including the motor, flywheel, capstan drive, and pressure roller, although not shown in this drawing, are substantially as shown in FIG. 1. In this embodiment the contact switch 38 is replaced by a movable means in the form of a rotatable disc 50 which abuts the path of travel of tape 10. Disc 50 has a tape engaging surface which is the peripheral edge of the disc. The peripheral edge of disc 50 is provided with a pair of spaced electrically isolated strips 52 which encircle the edge of the disc. As tape 10 passes between the tape engaging surface of disc 50 and a tape pad 54, the movement of the tape causes disc 50 to be rotated. The rotation of disc 50 rotates a shaft 56 which in turn rotates a wheel 58. A belt 60 communicates the rotation of wheel 58 to a wheel 62 which is connected to the input shaft of counter 34 such that the rotation of wheel 62 indexes counter 34.

As described in the previous embodiment, counter 34 has a reset button 36, the depression of which causes the counter to reset to zero. A solenoid 46 is connected between a power source 44 and a conductive plate 64 which forms a bracket to which disc 50 is rotatably mounted. Bracket 64 is insulated from the tape recorder chassis by means of insulating plate 66. One of the conductive strips 52 is electrically connected to bracket 64 by means of a brush, or the like (not shown). The other conductive strip 52 is operably connected to ground such that when conductive portion 42 of tape 10 is in position to contact both conductive strips 52 simultaneously, the strips are electrically connected thereby completing the circuit between ground and the power source 54. The completion of the circuit energizes solenoid 46 such that the plunger thereof (not shown) varies the position of the magnetic head thus changing the track. In addition a lever 48 mechanically connected to the plunger of solenoid 46 depresses reset button 36 thereby resetting counter 34.

When the cartridge 12 is placed in the appropriate position relative to the tape recorder chassis, disc 50 protrudes into opening 68 in the cartridge enclosure such that the peripheral edge thereof engages the tape. Pad 54 serves to maintain contact between the tape and disc 50. Tape 10 is driven in the conventional manner such that it moves between pad 54 and disc 50 thus rotating disc 50 in the direction shown by the arrow. The rotation of disc 50 is transferred to wheel 62 by means of wheel 58 and belt 60 such that counter 34 is indexed in accordance with the movement of the tape.

In this way, it is the movement of the tape itself which causes the indexing of the counter and should the tape be stopped while the tape drive mechanism continues to run, this will cause the indexing of the counter to cease. As a result, the counter always accurately reflects the position of the tape.

After the tape has run through one complete track, the conductive foil 42 which is adhered thereto will pass between pad 54 and disc 50 thereby electrically connecting the conductive strips 52 on disc 50. The electrical connection of the conductive strips 52 on disc 50 will cause the track change and counter reset circuit to be actuated thereby energizing solenoid 46 causing a plunger to vary the position of the magnetic head and lever 48 to depress reset button 36 on counter 34 simultaneously with the changing of the track. Thus, the counter is automatically reset at the beginning of each new track.

While but a single preferred embodiment of the present invention has been disclosed herein for purposes of illustration, it is apparent that many modifications and variations can be made thereon. For instance, in the described embodiment the counter is mechanically driven by a belt which operably connects the rotatable disc with the input shaft of the counter. However, as an alternative, the counter could be operated by detecting the number of rotations of the disc either electrically or mechanically. In addition, the counter itself could be of the electrical type, if desired. Furthermore, an independent controlling means may be utilized to reset the counter instead of utilizing the same mechanism which causes the magnetic head to change tracks. It is intended to cover all of these modifications and variations which fall within the scope of the present invention as defined by the appended claims:

I claim:

1. In a tape recorder for use with a tape having an electrically conductive portion, said recorder being of the type having a tape drive mechanism, a resettable counter for indicating the position of the tape, means for resetting the counter, and a power source, the improvement comprising movable means independent of the tape drive mechanism, said movable means abutting the tape and being driven by the movement of the tape, the counter being operatively connected to said movable means to be driven thereby, a pair of electrically isolated conductive strips situated on said moving means at the portion thereof abutting the tape, said counter resetting means being operatively connected to said power source through said conductive strips such that when said portion electrically connects said strips said counter resetting means is energized by said source.

2. The tape recorder of claim 1 wherein said movable means comprises a rotatable element having a tape engaging surface.

3. The tape recorder of claim 2 wherein said element is a disc and wherein said tape engaging surface is the peripheral edge of said disc.

* * * * *